3,580,958
PROCESS FOR THE PRODUCTION OF
ACETYLENE
Herbert Baader, Hermulheim, near Cologne, and Kurt Sennewald, Knapsack, near Cologne, Germany, assignors to Knapsack Aktiengesellschaft, Knapsack, near Cologne, Germany
No Drawing. Continuation of application Ser. No. 634,667, Apr. 28, 1967. This application Nov. 3, 1969, Ser. No. 871,595
Claims priority, application Germany, June 1, 1966, K 59,410
Int. Cl. C07c 11/24
U.S. Cl. 260—679　　　　　　　　　　　　　　　6 Claims

ABSTRACT OF THE DISCLOSURE

Acetylene is produced by subjecting a dihalogenoethane and/or a vinyl halide to dehydrohalogenation comprising passing the dihalogenoethane and/or the vinyl halide at a temperature between 400 and 850° C. over a catalyst formed of chlorides of the metals comprising lithium, beryllium, magnesium, calcium, strontium, barium, cerium, antimony, copper, silver, gold, zinc, cadmium, mercury, titanium, chromium, manganese, iron, cobalt, nickel, palladium and platinum, the chlorides being used alone or in combination and being deposited on a carrier, if desired.

---

This application is a continuation of application Ser. No. 634,667, filed Apr. 28, 1967, which is now abandoned.

The present invention relates to a process for the production of acetylene by subjecting a dihalogenoethane and/or a vinyl halide to dehydrohalogenation.

Acetylene is known to be a valuable starting material for commercial use in chemistry. Predominantly, it is produced commercially from calcium carbide and water, or by pyrolyzing hydrocarbons in an electric arc, or by subjecting hydrocarbons to the action of electric discharges while adding hydrogen, if desired. Acetylene can also be obtained by subjecting hydrocarbons to partial combustion.

The pyrolysis of dichloroethane carried out in the presence of a large excess of steam, reported in German Pat. 596,256, on the other hand has failed to gain commercial interest. Similarly, quite a series of further processes have only been carried out on a laboratory scale and have met with theoretical interest only. These include, inter alia, the manufacture of acetylene from iodoform and magnesium in ether, from dichloroethane or dibromoethane with the use of aniline-sodium or sodium alcoholate, or the decomposition of hydrocarbons under the action of ultraviolet light.

Particularly the processes tried on a laboratory scale for making acetylene are found to be disadvantageous either in using rather costly and commercially not readily available starting materials, or in yielding by-products useless in the process itself. These are the reasons why those processes have failed to gain practical commercial interest.

Similarly to conventional pyrolytic treatment in an arc, the production of acetylene from calcium carbide calls for the availability of cheap electrical power. The raw materials coal, water and lime are a further factor to consider in the carbide process. This means in other words that economic and geographical considerations are the factor determining the design and construction of carbide furnaces.

The production of acetylene by subjecting hydrocarbons to pyrolysis in an electric arc and/or to partial combustion has been found still to involve considerable technical difficulties. The high pyrolysis temperatures prevailing in the arc, which are preferably higher than 1200° C., are rather difficult to control, and high demands are made on material and apparatus. Furthermore, the gases produced by pyrolytic processes are known to require costly finishing treatment, and large facilities are necessary for the separation of carbon (carbon black, graphite), monovinylacetylene, diacetylene, ethylene, methane, hydrogen and possibly carbon oxides.

Pipelines on the other hand enable today the design and construction of crude oil refinery plants at almost any desired place. These furnish firstly the basic products important for use in industrial chemistry, for example ethylene and propylene; secondly, as a result of the heating gases obtained during the production of those basic products, they can be used as cheap energy sources for processes consuming considerable energy. This is the reason why today crude oil is preferred to carbide for the production of acetylene.

Processes for pyrolyzing natural gas and petroleum at temperatures lower than 1000° C. are widely used in industry. The so-called steam cracker or sand cracker enables the production of $C_2$-fractions substantially formed of ethylene which is increasingly used to replace the carbide in commercial processes. Yet there are some processes, for example the production of monovinylacetylene, which cannot be carried out without using acetylene. For manufacturers having access to ethylene, it is therefore of considerable interest to produce acetylene from dihalogeno-ethanes or vinyl halides at fairly low costs, while avoiding high temperature pyrolysis (arc pyrolysis), particularly in view of the fact that separated hydrogen halide can be retransformed into dihalogenoethane and/or vinyl halide by conventional methods, i.e. by oxychlorination with ethylene. Ultimately, it is thus possible by the present process to transform ethylene into acetylene at temperatures lower than 1000° C.

The present invention relates more particularly to a process for the manufacture of acetylene by subjecting a dihalogeno-ethane and/or a vinyl halide to dehydrohalogenation, which comprises passing a dihalogeno-ethane and/or a vinyl halide, at a temperature between 400 and 850° C., preferably between 600 and 800° C., over a catalyst formed of chlorides of the metals comprising lithium, beryllium, magnesium, calcium, strontium, barium, cerium, antimony, copper, silver, gold, zinc, cadmium, mercury, titanium, chromium, manganese, iron, cobalt, nickel, palladium and platinum, the chlorides being used alone or in combination and being deposited on a carrier, if desired.

The dihalogeno-ethanes suitable for use in the present process include 1,1-dichloroethane, 1,2-dichloroethane or 1,2-dibromoethane, and the useful vinyl halides include vinyl chloride or vinyl bromide. The carrier materials include pumice, silica gel ($SiO_2$), porcelain, glass fillers and/or the metals on which the catalytically active chlorides are based, and/or the corresponding metal oxides.

The dihalogenoethane and/or vinyl halide is dehydrohalogenated by vaporizing an appropriate halogenated hydrocarbon compound and passing the vaporized product over the catalyst. Substantially no acetylene is formed at temperatures lower than 400° C., whereas temperatures higher than 850° C. are already found to produce considerable cracking, accompanied by the precipitation of carbon on the catalyst and by the evolution of hydrogen chloride in the issuing gas.

The reaction can be carried out at atmospheric, elevated or reduced pressure. When carried out at elevated pressure, some consideration should be given to the limits of decomposition of the acetylene.

Anhydrous magnesium chloride on pumice has proved to be an especially suitable carrier catalyst. It is also possible to use some carriers in combination with one another, for example $SiO_2$ and one of the metals specified above and/or an oxide thereof. All that is needed at the temperatures specified above to initiate some slight dehydrohalogenation is the presence of such a carrier mixture which gives rise to the evolution of hydrogen chloride. Thereafter, the hydrogen chloride undergoes further reaction at the metal and metal oxide surface and produces the metal chlorides as the actual catalysts which then initiate and promote further reaction. Preferably, however, the reaction should be started while using the metal chlorides from the onset in combination with a carrier.

A solid bed, flow bed or fluidized bed catalyst can be used. However, it is also possible to omit the carrier and to use the appropriate metal chloride or a chloride mixture in solid or molten form.

The acetylene can remain in the reactor for a period of time of up to 10 seconds without the acetylene being decomposed to a considerable extent at about 700° C. at atmospheric pressure.

The fact that acetylene can be produced by the present process is an unexpected result bearing in mind that earlier pyrolytic processes for the production of vinyl chloride from 1,2-dichloroethane, which are also carried out at temperatures that preferably lie between 400 and 600° C., have been found to produce no noteworthy amounts of acetylene. It has even been reported in literature that no more than traces of acetylene are obtained by the thermal decomposition of dichloroethane, for example at 440° C. It is also known that by-products, such as 2-chlorobutadiene-(1,3) and monovinyl acetylene, accompany the production of vinyl chloride and hydrogen chloride. Acetylene, however, has always been obtained in traces only; if formed as an intermediate, the reaction conditions used would cause it to react at once to form by-products. This confirms that acetylene has a pronounced tendency to undergo polymerization and oligomerization yielding cuprene and aromatic hydrocarbons as the principal products. The fact that passing acetylene over an anhydrous zinc chloride/pumice catalyst heated to 450–870° C. has been reported in literature to involve the formation of aromates, adds to the unexpectedness of the present process, where the reaction conditions and the metal chloride catalyst enable acetylene to be obtained in high yields.

The particular technical advantage associated with the process of the present invention is seen to reside in the fact that vinyl chloride or dichloroethane production facilities can be modified at fairly low costs to enable the manufacture of acetylene without need of carbide and high temperature pyrolysis. Given that 1,2-dichloroethane is produced from hydrogen chloride, air and ethylene by oxychlorination, it is possible by the present dehydrohalogenation process to obtain acetylene from ethylene, and no more than constant amouts of hydrogen halide are needed to achieve this. High temperatures such as found to prevail in a pyrolysis are avoided, and apparatus and material are accordingly subject to substantially reduced stress. The dehydrochlorination being achieved in the absence of steam (cf. German Pat. 596,256) there is no danger of the iron or stainless steel pyrolysis apparatus being subject to corrosion.

The reaction mixture substantially contains unreacted dichloroethane, vinyl chloride, hydrogen chloride and acetylene, which are known to be separable from each other, and it can therefore be worked-up much more readily. The arc pyrolysis and processes based on the partial combustion of hydrocarbons on the other hand call for great outlay of apparatus to separate $CO$, $CO_2$, $H_2$, $CH_4$ and similar substances.

EXAMPLE 1

A quartz reactor 50 cm. long and 28 mm. wide was charged with 240 cc. of a catalyst formed of pumice particles with a size of 3 to 5 mm. The pumice had been impregnated with 20% by weight anhydrous magnesium chloride. Vinyl chloride was passed over the catalyst. The temperature prevailing inside the reactor was 650° C. The reaction gas leaving the reactor was water-scrubbed to free it from hydrogen chloride, analyzed by gas-chromatography or absorbed in an organic solvent, for example acetone.

About 2 mols vinyl chloride were passed through the reactor per hour. The reaction gas freed from hydrogen chloride was found to be formed of 77.8% by volume unreacted vinyl chloride and 18.8% by volume acetylene. The balance of 3.4% by volume consisted substantially of monovinyl acetylene, butadiene-(1,3), 2-chlorobutadiene-(1,3), and 1,2-dichloroethane. The vinyl chloride conversion rate was found to be 22.2%, and acetylene was obtained in a yield of 84.6%, referred to the vinyl chloride transformed.

EXAMPLE 2

Vaporized 1,2-dichloroethane was passed for 10 hours at a rate of 136.9 g./hr. through the apparatus used in Example 1 under the conditions described therein. The 1,2-dichloroethane was found to have been transformed practically quantiatively. 13.83 mols dichloroethane gave 3.69 mols acetylene and 9.03 mols vinyl chloride. The acetylene was obtained in a yield of 26.7%; 65.3% vinyl chloride was obtained at the same time.

During the reaction, the catalyst was found to assume a graphite-grey coloration, but the activity could not be found to have been reduced.

EXAMPLE 3

5.67 mols 1,2-dichloroethane were reacted at a temperature of 750° C. for 4 hours under the conditions described in Example 2. 2.37 mols acetylene and 2.63 mols vinyl chloride were obtained, i.e., acetylene was obtained in a yield of 41.8% and vinyl chloride was obtained in a yield of 46.3%.

EXAMPLE 4

5.45 mols 1,1-dichloroethane were reacted at a temperature of 720° C. for 4 hours under the conditions described in Example 2. 1.46 mols acetylene and 3.53 mols vinyl chloride were obtained, i.e. vinyl chloride was obtained in a yield of 64.7% and acetylene was simultaneously obtained in a yield of 26.8%.

EXAMPLE 5

1,2-dibromoethane was reacted at a temperature of 650° C. for 1 hour under the conditions described in Example 2. Acetylene and vinyl bromide were obtained as the principal products.

What is claimed is:

1. A process for producing acetylene by subjecting a member selected from the group consisting of dihalogenoethane and vinyl halide to dehydrohalogenation, which comprises passing at least one of said members over a chloride of a Group II–A metal as catalyst; effecting the reaction at a temperature of about 600–850° C.

2. A process for the production of acetylene by subjecting a member selected from the group consisting of dihalogenoethane and vinyl halide to dehydrohalogenation; which comprises passing at least one of the said members over a catalyst formed of the chloride of a metal selected from the group consisting of beryllium, magnesium, calcium, strontium, barium; effecting the reaction at a temperature of about 600–850° C.

3. The process of claim 1 wherein the catalyst is deposited on a carrier.

4. The process of claim 1 wherein said member to undergo dehydrohalogenation is passed over the catalyst at a temperature between 600 and 800° C.

5. A process as claimed in claim 2 wherein the dihalogenoethane is at least one member selected from the group consisting of 1,1-dichloroethane, 1,2-dichloroethane and 1,2-dibromoethane and wherein the vinyl halide is at least one member selected from the group consisting of vinyl chloride and vinyl bromide.

6. A process as claimed in claim 3 wherein the carrier is at least one member selected from the group consisting of pumice, silica gel ($SiO_2$), porcelain, glass fillers, the metals on which the catalytically active chloride are based, and the corresponding metal oxides.

References Cited
UNITED STATES PATENTS

| | | | |
|---|---|---|---|
| 2,803,678 | 8/1957 | Conrad | 260—657 |
| 2,803,680 | 8/1957 | Conrad | 260—657 |
| 2,803,679 | 8/1957 | Conrad | 260—657 |
| 2,765,349 | 10/1956 | Conrad | 260—656 |

FOREIGN PATENTS

| | | | |
|---|---|---|---|
| 842,539 | 7/1960 | Great Britain | 260—679 |
| 596,256 | 8/1931 | Germany | 260—679 |

CURTIS R. DAVIS, Primary Examiner

U.S. Cl. X.R.

260—677